United States Patent [19]

Ishiwatari

[11] Patent Number: 5,446,725
[45] Date of Patent: Aug. 29, 1995

[54] METHOD OF CHANGING OVER PATH SWITCH IN OPTICAL TRANSMISSION DEVICE

[75] Inventor: Junichi Ishiwatari, Kawasaki, Japan

[73] Assignee: Fujitsu Limited, Kawasaki, Japan

[21] Appl. No.: 348,181

[22] Filed: Nov. 28, 1994

Related U.S. Application Data

[63] Continuation of Ser. No. 936,209, Aug. 27, 1992, abandoned.

[30] Foreign Application Priority Data

Aug. 29, 1991 [JP] Japan .................. 3-218983

[51] Int. Cl.⁶ ........................................ H04L 1/22
[52] U.S. Cl. .................. 370/16.1; 370/85.12; 359/110; 395/181
[58] Field of Search ............... 370/13, 15, 16, 16.1, 370/54, 55, 85.12, 85.15; 371/8.2, 11.2, 20.6, 68.2; 340/825.02, 825.03, 825.05, 827; 359/110, 119, 161, 173

[56] References Cited

U.S. PATENT DOCUMENTS

| | | | |
|---|---|---|---|
| 4,594,709 | 6/1986 | Yasue | 370/16 X |
| 4,622,664 | 11/1986 | Itoh et al. | 370/16 X |
| 4,633,246 | 12/1986 | Jones et al. | 370/16 X |
| 4,696,001 | 9/1987 | Gagliardi et al. | 370/16 X |
| 4,747,097 | 5/1988 | Ohya et al. | 370/16 X |
| 4,829,512 | 5/1989 | Nakai et al. | 370/16 |
| 4,835,763 | 5/1989 | Lau | 370/16 |
| 4,837,856 | 6/1989 | Glista, Jr. | 359/110 |
| 4,855,993 | 8/1989 | Hamada et al. | 370/16 |
| 5,042,031 | 8/1991 | Yokoyama et al. | 370/16 X |
| 5,056,090 | 10/1991 | Kubota | 371/11.2 X |
| 5,136,589 | 8/1992 | Konishi | 371/11.2 |
| 5,153,874 | 10/1992 | Kohno | 371/8.2 X |
| 5,159,595 | 10/1992 | Flanagan et al. | 370/16 X |
| 5,229,875 | 7/1993 | Glista | 359/110 |
| 5,307,353 | 4/1994 | Yamashita et al. | 370/16.1 X |
| 5,309,435 | 5/1994 | Hirome | 370/85.12 |

*Primary Examiner*—Melvin Marcelo
*Attorney, Agent, or Firm*—Staas & Halsey

[57] ABSTRACT

An optical transmission device for transmitting and receiving SONET signals has a path switch controlled in operation depending on the states of signals received bidirectionally over optical transmission lines. The optical transmission device generates one of a plurality of path switch alarms indicative of respective faults of the signals, based on the states of the signals transmitted to the path switch, and actuates the path switch depending on the generated path switch alarm to output one of the signals from two line terminal equipment units to a lower-level receiver. When SONET signals are transmitted and received in an A/B ring mode, the path switch is actuated in at least one of five control modes to output one of the signals from the two line terminal equipment unit to the lower-level receiver. When SONET signals are transmitted and received in a linear mode, a tributary path function added to the path switch is activated to meet a requirement for the reception of an optical signal transmitted over a unidirectional one of the optical transmission lines.

16 Claims, 13 Drawing Sheets

FIG. 9

| L-IN D/E | L-IN CNT | PATH SW STATE |
|---|---|---|
| H (ENABLE) | H | LOCK IN TO INITIAL PATH |
| H (ENABLE) | L | PATH SW CHANGED OVER |
| L (DISABLE) | H | PATH SW CHANGED OVER (LOCK IN FUNCTION INACTIVATED) |
| L (DISABLE) | L | PATH SW CHANGED OVER (LOCK IN FUNCTION INACTIVATED) |

FIG. 11

| PROV. E | PROV. W | OPERATION |
|---|---|---|
| L | L | IGNORED |
| H | L | LOCKED TO EAST PATH |
| L | H | LOCKED TO WEST PATH |
| H | H | IGNORED |

FIG. 10

| PSA | MAINT MANU | MANU MODE | PATH SW | |
|---|---|---|---|---|
| H | * | * | * | AUTO SETTING (NORMAL OPERATION) |
| L | H | * | * | AUTO SETTING (NORMAL OPERATION) |
| L | L | L | * | AUTO SETTING (NORMAL OPERATION) |
| L | L | H | L | MANU SETTING (EAST) |
| L | L | H | H | MANU SETTING (WEST) |

* : DON'T CARE

FIG. 12

| MAINT FORCE | FORCE MODE | PATH SW | SETTING |
|---|---|---|---|
| H | * | * | AUTO OR MANU OR TRIBUTARY OR LOCK IN SETTING |
| L | L | * | AUTO OR MANU OR TRIBUTARY OR LOCK IN SETTING |
| L | H | L | FORCE SETTING (EAST) |
| L | H | H | FORCE SETTING (WEST) |

* : DON'T CARE

FIG. 13

| MAIT FC | FC MODE | PROV (E) | PROV (W) | PSA | MAIT MANU | MANU MODE | P-SW DEF | L-IN E/D | L-IN CNT | PATH SW | OPERATION |
|---|---|---|---|---|---|---|---|---|---|---|---|
| H | * | L | L | L | H | * | HorL | L | * | * | AUTO SETTING |
| H | * | L | L | L | H | * | HorL | H | L | * | AUTO SETTING |
| H | * | L | L | L | H | * | L | H | H | * | L-IN SETTING (EAST) |
| H | * | L | L | L | * | * | H | H | H | * | L-IN SETTING (WEST) |
| H | * | L | L | H | L | * | HorL | H | H | * | L-IN SETTING (EORW) |
| H | * | L | L | L | L | * | HorL | H | L | * | L-IN SETTING (EORW) |
| H | * | L | L | L | L | * | HorL | H | H | * | AUTO SETTING |
| H | * | L | L | L | L | L | HorL | * | * | * | L-IN SETTING (EORW) |
| H | * | L | L | L | L | H | * | * | * | L | MANU SETTING (EAST) |
| H | * | L | L | L | * | H | * | * | * | H | MANU SETTING (WEST) |
| H | * | H | L | * | * | * | * | * | * | * | PROV SETTING (EAST) |
| H | * | L | H | * | L | * | * | * | * | * | PROV SETTING (WEST) |
| H | * | H | H | L | * | H | * | H | H | HorL | MANU SETTING (EORW) |
| H | * | H | H | H | * | * | HorL | H | L | * | L-IN SETTING (EORW) |
| H | * | H | H | L | H | * | * | L | * | * | AUTO SETTING |
| L | L | LLorHH | LLorHH | * | * | * | * | * | * | * | AUTO SETTING |
| L | L | H | L | * | * | * | * | * | * | * | PROV SETTING (EAST) |
| L | L | L | H | * | * | * | * | * | * | * | PROV SETTING (WEST) |
| L | L | LLorHH | LLorHH | L | * | H | HorL | H | * | * | MANU SETTING (EORW) |
| L | L | LLorHH | LLorHH | L | * | * | HorL | * | * | * | L-IN SETTING (EORW) |
| L | L | LLorHH | LLorHH | H | * | * | * | * | * | * | AUTO SETTING |
| L | H | * | * | L | * | * | * | H | * | L | FORCE SETTING (EAST) |
| L | H | * | * | H | * | * | * | * | * | H | FORCE SETTING (WEST) |

*: DON'T CARE

FIG. 15

| PROV (E) | PROV (W) | RINDWN | | C2 BYTE | | SELECTED PATH |
|---|---|---|---|---|---|---|
| | | PATH E | PATH W | PATH E | PATH W | |
| L | L | NO ALM | NO ALM | C2=0 | C2=0 | EAST PATH (REV) |
| L | L | NO ALM | NO ALM | C2≠0 | C2=0 | EAST PATH |
| L | L | NO ALM | NO ALM | C2=0 | C2≠0 | WEST PATH |
| L | L | NO ALM | NO ALM | C2≠0 | C2≠0 | PREVIOUS CONNECTION MAINTAINED |
| L | L | ALM | NO ALM | C2=0 | C2=0 | EAST PATH (REV) |
| L | L | NO ALM | ALM | C2=0 | C2=0 | EAST PATH (REV) |
| L | L | ALM | ALM | C2=0 | C2=0 | EAST PATH (REV) |
| L | L | ALM | NO ALM | C2≠0 | C2=0 | EAST PATH (REV) |
| L | L | NO ALM | ALM | C2≠0 | C2=0 | EAST PATH |
| L | L | ALM | ALM | C2≠0 | C2=0 | EAST PATH (REV) |
| L | L | ALM | NO ALM | C2=0 | C2≠0 | WEST PATH |
| L | L | NO ALM | ALM | C2=0 | C2≠0 | EAST PATH (REV) |
| L | L | ALM | ALM | C2=0 | C2≠0 | EAST PATH (REV) |
| L | L | ALM | NO ALM | C2≠0 | C2≠0 | WEST PATH |
| L | L | NO ALM | ALM | C2≠0 | C2≠0 | EAST PATH |
| L | L | ALM | ALM | C2≠0 | C2≠0 | EAST PATH (REV) |
| H | L | * | * | * | * | EAST PATH |
| L | H | * | * | * | * | WEST PATH |
| H | H | NO ALM | NO ALM | C2=0 | C2=0 | EAST PATH (REV) |
| H | H | NO ALM | NO ALM | C2≠0 | C2=0 | EAST PATH |
| H | H | NO ALM | NO ALM | C2=0 | C2≠0 | WEST PATH |
| H | H | NO ALM | NO ALM | C2≠0 | C2≠0 | PREVIOUS CONNECTION MAINTAINED |
| H | H | ALM | NO ALM | C2=0 | C2=0 | EAST PATH (REV) |
| H | H | NO ALM | ALM | C2=0 | C2=0 | EAST PATH (REV) |
| H | H | ALM | ALM | C2=0 | C2=0 | EAST PATH (REV) |
| H | H | ALM | NO ALM | C2≠0 | C2=0 | EAST PATH (REV) |
| H | H | NO ALM | ALM | C2≠0 | C2=0 | EAST PATH |
| H | H | ALM | ALM | C2≠0 | C2=0 | EAST PATH (REV) |
| H | H | ALM | NO ALM | C2=0 | C2≠0 | WEST PATH |
| H | H | NO ALM | ALM | C2=0 | C2≠0 | EAST PATH (REV) |
| H | H | ALM | ALM | C2=0 | C2≠0 | EAST PATH (REV) |
| H | H | ALM | NO ALM | C2≠0 | C2≠0 | WEST PATH |
| H | H | NO ALM | ALM | C2≠0 | C2≠0 | EAST PATH |
| H | H | ALM | ALM | C2≠0 | C2≠0 | EAST PATH (REV) |

METHOD OF CHANGING OVER PATH SWITCH IN OPTICAL TRANSMISSION DEVICE

This application is a continuation, of application Ser. No. 07/936,209, filed Aug. 27, 1992, now abandoned.

BACKGROUND OF THE INVENTION

1. Field of the Invention

The present invention relates to a method of changing over a path switch in an optical transmission device which transmits and receives SONET (Synchronous Optical Network) signals in an A/B ring mode or a linear mode, and more particularly to a method of changing over a path switch which is connected, through respective paths, to two LTE (Line Terminal Equipment) units in an optical transmission device which receives optical signals transmitted bidirectionally over optical transmission lines, for selectively connecting one of the LTE to a lower-level receiver.

2. Description of the Related Art

The recent development of an information society results in demands for communicating information in a wide range of forms (e.g., speech, images, data) and in a greater quantity over a wider geographic region. To meet such demands, efforts are being made to establish global standards for communication interfaces in various organizations including the CCITT (International Telegraph and Telephone Consulative Committee). One of the proposals is SONET which is optical interface standards in North America (including the United States of America). There are attempts to design and develop optical transmission devices according to the SONET, referred to as FLM (Fiber Looped Multiplexer) 150/600 ADM (Add/Drop Multiplexer).

To perform ADM operation of the FLM 150/600 ADM, bidirectional paths therein have to be selected or changed over by a path switch.

An FLM 150/600 ADM for transmitting and receiving SONET signals operates in an A/B ring mode as follows: Two identical optical signals that have been bidirectionally transmitted from a transmitting ADM over ring-shaped transmission lines are received by a receiving ADM, and the received signals or a signal free of a line fault is selected by the path switch, and transmitted to a lower-level receiver.

According to the standards TA (TECHNICAL ADVISORY)-496, third volume, pushed by BELLCORE (Bell Communications Research), which is a U.S. organization for establishing communication standards, the path switch selects an error-free signal when:

1. RINDWN is produced;
2. P-AIS (Path-Alarm Indication Signal) is received; or
3. B3-Error is generated.

RINDWN is an alarm signal that is produced indicating an input signal fault when no clock is supplied while the clock of a signal (composed of data and clock) supplied to the path switch is being monitored. P-AIS is an alarm signal received by the path switch, which is carried on a transmitted signal in the event of a fault of a higher-level side. Higher-level faults include lack of an input signal for a higher-level transmitter/receiver, an optical fiber break, a bit error, etc. B3-Error is an alarm signal indicating an input signal fault when an error rate of signals supplied to the path switch exceeds 0.1%.

When either one of the above three alarm signals is produced, the path switch connects the path other than the path which is suffering the fault to a lower-level receiver.

When an FLM 150/600 ADM for transmitting and receiving SONET signals operates in linear mode, the path switch is changed over based on only an un-eq (Un-Equipment) code contained in each of signals that are bidirectionally supplied to the ADM. The un-eq code is a code capable of determining whether a signal is being transmitted from a transmitting ADM. When all un-eq codes are 0, it is determined that no signal is being transmitted from the transmitting ADM, and a signal from another ADM than the ADM from which the un-eq codes are supplied is selected by the path switch and transmitted to a lower-level receiver.

However, there has not been developed any technique as to how to operate the path switch during operation of an ADM operates in the A/B ring mode, when:

1. the above three faults occur simultaneously with respect to both two signals that are supplied from the two LTE through the respective paths to the path switch;
2. the above three faults occur successively, resulting in a frequent changeover of the path switch;
3. the path switch is to be manually changed over in the absence of the above three faults, in order to confirm whether the path switch can normally be changed over;
4. the path switch is to be locked to a selected one of the paths for transmission and reception of optical signals over a unidirectional transmission line of the ring-shaped transmission lines, without concern over the above three faults; or
5. the path switch is to be forcibly changed over for a test even if any one of the above three faults is taking place.

Therefore, it has been impossible to operate the path switch when one of the above five conditions occur.

Furthermore, while an ADM is operating in the linear mode, there has been no way to meet a demand for transmission and reception of optical signals over a unidirectional transmission line of the ring-shaped transmission lines.

SUMMARY OF THE INVENTION

In view of the aforesaid conventional difficulties, it is an object of the present invention to provide a method of changing over a path switch in an optical transmission device to meet any of the above five conditions through appropriate control based on the state of received signals.

To achieve the above object, there is provided in accordance with the present invention a method of changing over a path switch in an optical transmission device having two line terminal equipment units for receiving optical signals transmitted bidirectionally over ring-shaped optical transmission lines, the path switch being connected to respective paths to the line terminal equipment for selectively outputting one of output signals from the line terminal equipment to a lower-level receiver.

The method comprises the steps of monitoring, with the path switch, output signals transmitted from the two line terminal equipment units to the path switch over the respective paths, generating one of a plurality of path switch alarms indicative of respective faults of the signals, based on the states of the signals applied to the path switch, and actuating the path switch depending on the generated path switch alarm to output one of the output signals from the two line terminal equipment units the lower-level receiver.

The line terminal equipment unit is supplied with SONET signals over the optical transmission lines arranged in a ring shape in an A/B ring mode. The path switch is controlled in the following five control modes:

The first mode is a mode for classifying the path switch alarms in different ranks depending on the degree of signal faults indicated thereby, generating path switch alarms based on the states of two signals that are supplied simultaneously to the path switch over the paths, and connecting the path transmitting the signal with respect to which a path switch alarm in a lower rank is generated, to the lower-level receiver with the path switch.

The second mode is a mode for counting the number of times which the path switch is changed over from the connection between one of the paths and the lower-level receiver to the connection between the other of the paths and the lower-level receiver, and vice versa, and locking the path switch against further changeovers when the counted number of times reaches a predetermined value.

The third mode is a mode for providing the path switch with a manual changeover function to manually change over from the connection between one of the paths and the lower-level receiver to the connection between the other of the paths and the lower-level receiver, and vice versa, and activating the manual changeover function only when the path switch alarms are not produced.

The fourth mode is a mode for providing the path switch with a tributary path function to select and lock the connection between one of the paths and the lower-level receiver or the connection between the other of the paths and the lower-level receiver, and activating the tributary path function when the optical transmission device is required to receive an optical signal from a unidirectional one of the optical transmission lines.

The fifth mode is a mode for providing the path switch with a forcible changeover function to forcibly change over from the connection between one of the paths and the lower-level receiver to the connection between the other of the paths and the lower-level receiver, and vice versa, and forcibly changing over the path switch irrespective of whether path switch alarms are generated when the forcible changeover function is activated.

When at least two of the first, second, third, fourth, and fifth modes are to be simultaneously performed, the path switch is controlled to operate successively in the fifth mode, the fourth mode, the third mode, the second mode, and the first mode in the order named.

The two line terminal equipment units may be supplied with SONET signals from the optical transmission lines in a linear mode. The path switch is provided with a tributary path function to select and lock the connection between one of the paths and the lower-level receiver or the connection between the other of the paths and the lower-level receiver. The tributary path function is activated when the optical transmission device is required to receive an optical signal from a unidirectional one of the optical transmission lines.

The above and other objects, features, and advantages of the present invention will become apparent from the following description when taken in conjunction with the accompanying drawings which illustrate preferred embodiments of the present invention by way of example.

BRIEF DESCRIPTION OF THE DRAWINGS

FIG. 9 is a diagram showing path switch states depending on L-IN CNT and L-IN ED bits;

FIG. 10 is a diagram showing path switch states depending on PSA, MAINT MANU, and MANU MODE bits;

FIG. 11 is a diagram showing path switch states depending on PROV. E and PROV. W bits;

FIG. 12 is a diagram showing path switch states depending on MAINT FORCE and FORCE MODE bits;

FIG. 13 is a diagram showing path switch states depending on the order of priority of five path switch functions;

FIG. 15 is a diagram showing the manner in which a path switch operates in the linear mode.

DETAILED DESCRIPTION OF THE PREFERRED EMBODIMENTS

Figure 1:
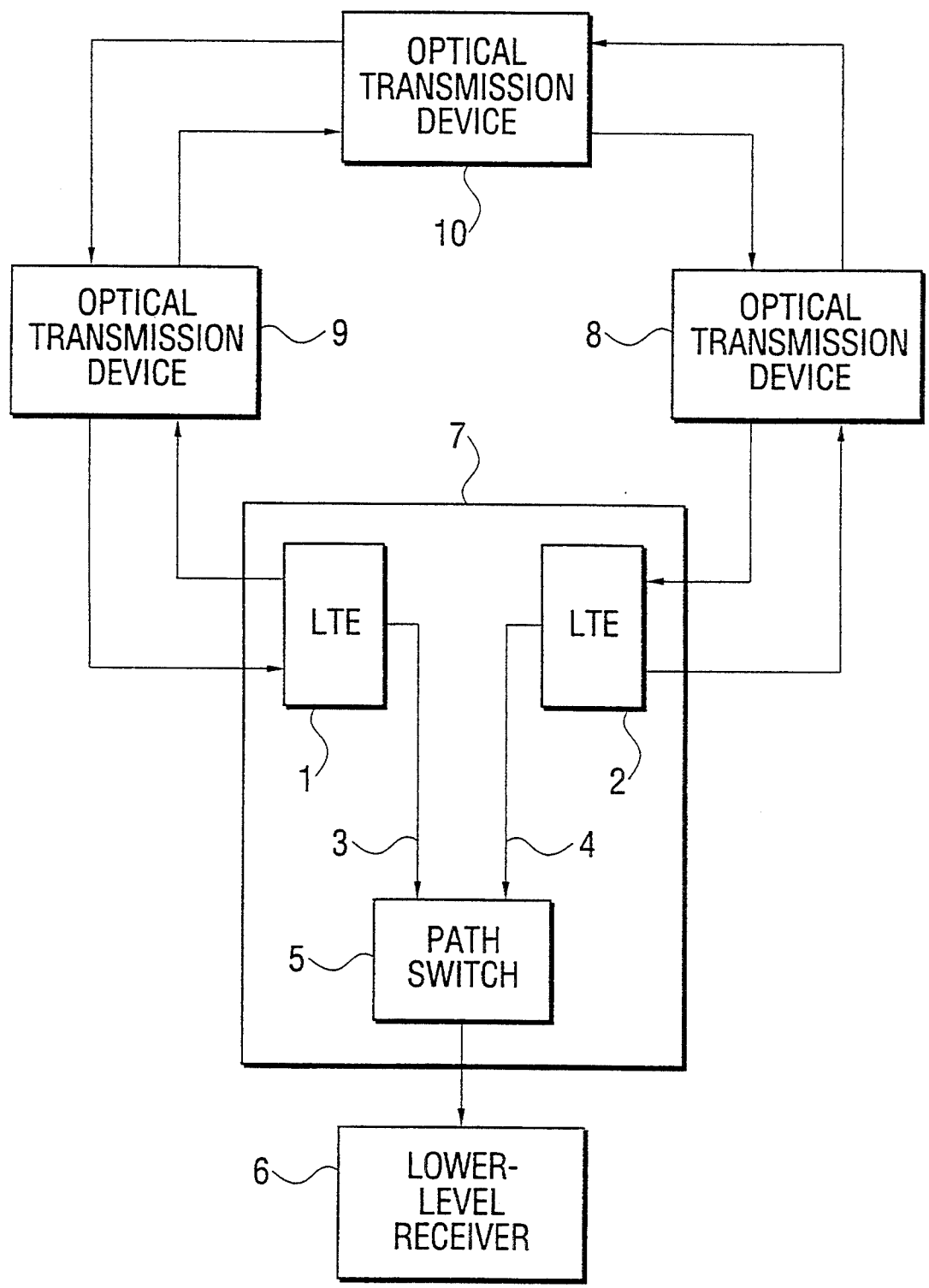
FIG. 1 is a block diagram of a system of optical transmission lines and optical transmission devices connected thereto.

FIG. 1 shows in block form a system of optical transmission lines and optical transmission devices connected thereto. As shown in FIG. 1, each of optical transmission devices 7, 8, 9, 10 connected to optical transmission lines comprises two LTE (Line Terminal Equipment) units 1, 2 for receiving optical signals transmitted bidirectionally over the optical transmission lines, and a path switch (P-SW) 5 connected to the LTE units 1, 2 respectively through paths 3, 4. The path switch 5 serves to supply a selected one of output signals from the LTE units 1, 2 to a lower-level receiver 6. Specifically, one of a plurality of path switch alarms PSA indicative of respective signal faults is generated on the basis of the state of signals applied to the path switch 5, and the path switch 5 is actuated according to the generated path switch alarm PSA to transmit one of the output signals from the LTE units 1, 2 to the lower-level receiver.

The system shown in FIG. 1 carries out the following five control modes in an A/B ring mode:

If path switch alarms PSA are simultaneously generated on the basis of respective two signals that are applied over the paths 3, 4 to the path switch 5, then the path switch 5 connects the path 3 or 4 which transmits the path switch alarm PSA of lower order to the lower-level receiver 6. This control mode is referred to as a first mode.

Changeovers of the path switch 5 are counted, and when the count reaches a predetermined value, the path switch 5 is locked against further changeovers. This control mode is referred to as a second mode.

A manual changeover function of the path switch 5 can be activated only when no path switch alarm PSA is generated, This control mode is referred to as a third mode.

When an optical signal is transmitted and received only unidirectionally over the optical transmission lines, a selective lock-in function of the path switch 5 can be activated. This control mode is referred to as a fourth mode.

When a forced changeover function of the path switch 5 is activated, no changeover of the path switch 5 is effected even if a path switch alarm PSA is produced. This control mode is referred to as a fifth mode.

If two or more of the above five modes are to be simultaneously performed, the path switch 5 is operated on successively in the fifth, fourth, third, second, and first modes in the order named.

When an optical signal is to be received unidirectionally over the optical transmission lines while the system shown in FIG. 1 is in a linear mode, the selective lock-in function of the path switch 5 can be activated.

Figure 2:
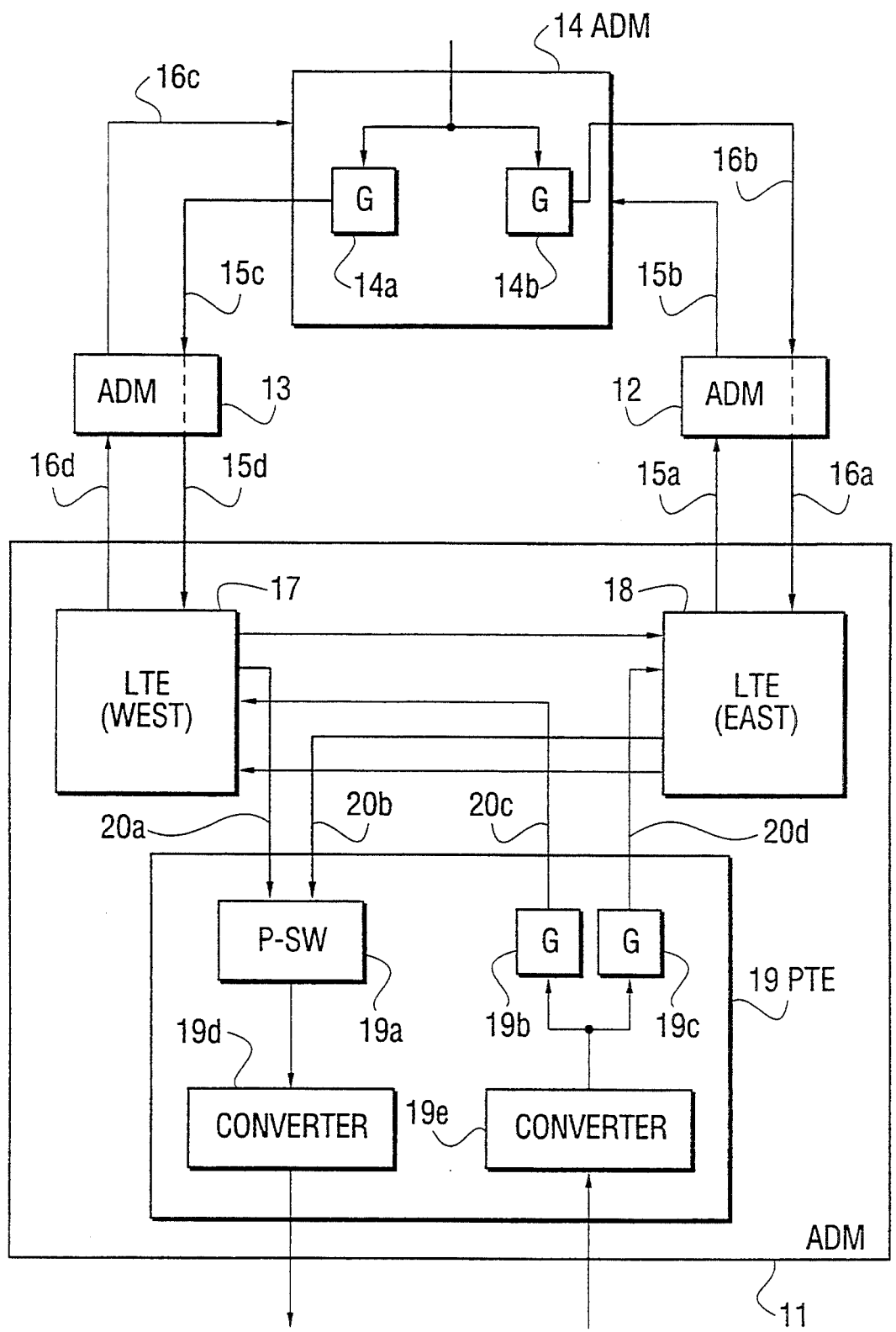
FIG. 2 is a block diagram of an optical transmission device in an A/B ring mode.

FIG. 2 schematically shows an optical transmission device based on the SONET for the transmission of optical signals in the A/B ring mode. The optical transmission device comprises FLM (Fiber Looped Multiplexer) 150/600 ADM (Add/Drop Multiplexer) 11, 12, 13, 14. The ADMs 11, 12, 13, 14 are connected in a ring pattern by reciprocatory optical transmission lines 15a–15d, 16a–16d. Since the ADMs 11, 12, 13, 14 are of an identical internal structure, only the internal structure of the ADM 11 will be described below, and the internal structures of the other ADMs 12, 13, 14 will be omitted from illustration.

The ADM 11 comprises LTE (Line Terminal Equipment) units 17, 28 for terminating (transmitting and receiving) optical signals or LINE signals, and a PTE (Path Terminal Equipment) unit 19 for terminating (transmitting and receiving) signals over paths 20a, 20b. The LTE unit 17 is connected to the optical transmission lines 15d, 16d, and called WEST LTE. The LTE unit 18 is connected to the optical transmission lines 15a, 16a, and called EAST LTE. The internal structures of the LTE unit 17, 18 and signal input/output relationship between the LTE unit 17, 18 or between the LTE units 17, 18 and the PTE 19 unit will be described later on with reference to FIG. 3.

Figure 4:
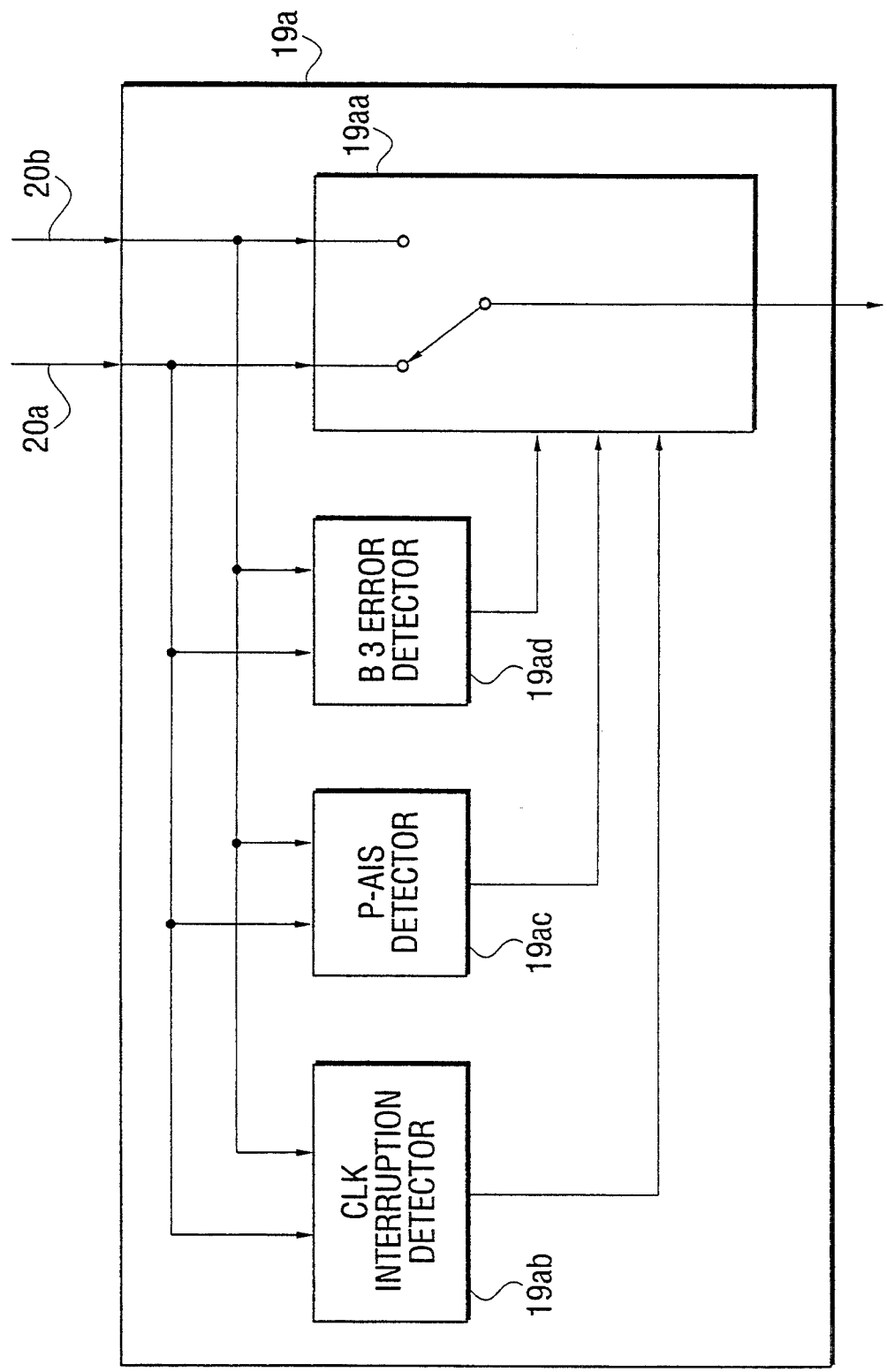
FIG. 4 is a block diagram of a path switch.

The PTE unit 19 comprises a path switch (P-SW) 19a connected to the LTE units 17, 18 through paths 20a, 20b, a pair of gates 19b, 19c connected to the LTE units 17, 18 through respective paths 20c, 20d, and a converter 19d connected to the path switch 19a, and a converter 19e connected to the gates 19b, 19c. The internal structure of the path switch 19a will be described later on with reference to FIG. 4. When the path switch 19a is changed over, one of output signals (STS-1 frame signals having a transmission rate of 51.84 Mbit/s, described later on with reference to FIG. 5) of the LTE units 17, 18 is selected and supplied to the converter 19d. The converter 19d converts the supplied signal into a DS3 signal having a transmission rate of 44.92 Mbit/s, which is supplied to a Lower-level transmitter/receiver such as an ADM 13 or the like. A DS3 signal from the lower-level transmitter/receiver is converted by the converter 19e into an STS-1 frame signal that is in turn applied to the gates 19b, 19c. The gates 19b, 19c are controlled by the PTE unit 19 to supply their output signals to the LTE units 17, 18, respectively.

When in the A/B ring mode as shown in FIG. 2, the ADM 14 is a transmitting ADM, and the ADM 11 is a receiving ADM. In the transmitting ADM 14, the gates 14a, 14b are open, allowing one signal to be transmitted to the ADMs 13, 12. Since the transmitted signals are not destined to the ADMs 13, 12, the ADMs 13, 12 pass these signals to the LTE units 17, 18, respectively. Operation of the LTE units 17, 18 and the path switch 19a will be described below with reference to FIGS. 3 and 4.

Figure 3:
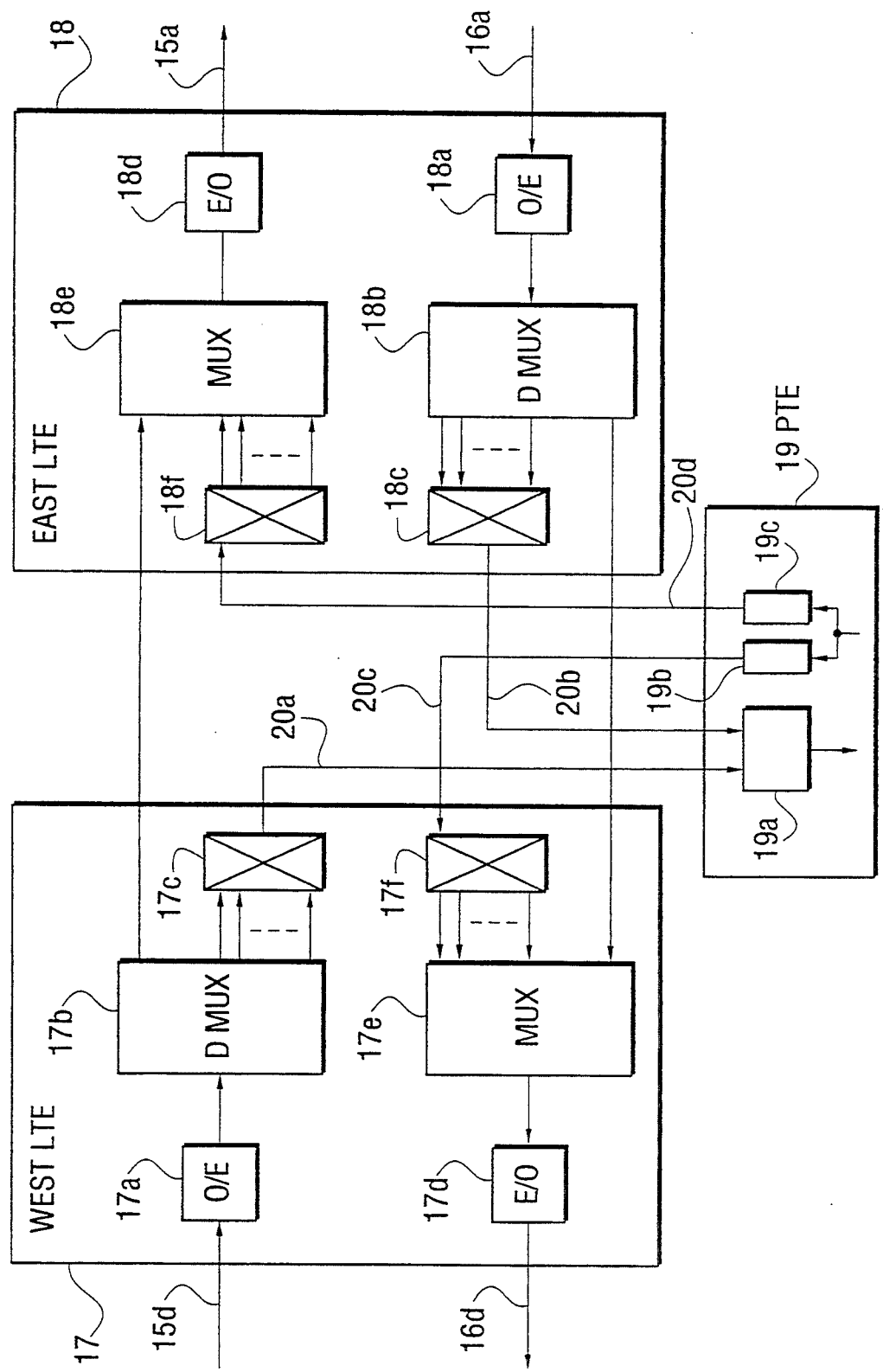
FIG. 3 is a block diagram of line terminal equipment (LTE)

FIG. 3 shows in block form the internal structure and arrangement of the LTE units 17, 18. A higher-level optical signal transmitted over the optical transmission line 15d is converted into an electric signal by an optoelectric converter (O/E) 17a, and the electric signal is divided into lower-level signals by a demultiplexer (DMUX) 17b. One of the lower-level signals is sent to a multiplexer (MUX) 18e in the EAST LTE 18, whereas the other lower-level signals are transmitted to a drop switch 17c. The drop switch 17c selects a drop channel to be dropped, and sends the selected drop channel to the path switch 19a of the PTE unit 19. The path switch 19a selects either the output signal from the drop switch 17 or an output signal from a drop signal 18c (described later), and outputs the selected output signal.

Likewise, a higher-level optical signal transmitted over the optical transmission line 16a is converted into an electric signal by an optoelectric converter (O/E) 18a in the EAST LTE 18, and the electric signal is divided into Lower-Level signals by a demultiplexer (DMUX) 18b, A drop switch 18c selects a drop channel, and sends the selected drop channel to the path switch 19a of the PTE unit 19.

An add channel from the gate 19b of the PTE unit 19 to the WEST LET 17 is switched by an add switch 17f and converted by a multiplexer (MUX) 17e into higher-Level signals which are converted by an electrooptic converter (E/O) 17d into an optical signal which is outputted to the optical transmission line 16d. Similarly, an add channel from the gate 19a of the PTE unit 19 to the EAST LTE 18 is switched by an add switch 18f and converted by a multiplexer (MUX) 18e into higher-level signals which are converted by an electrooptic converter (E/O) 18d into an optical signal which is outputted to the optical transmission line 15a.

FIG, 4 show in block form the internal structure of the path switch 19a. The path switch 19a includes a microprocessor, which is however omitted from illustration. The path switch 19a has a switch mechanism 19aa connected to the paths 20a, 20b, and CLK breakage, P-AIS, and B3 error detectors 19ab, 19ac, 19ad which are connected to the paths 20a, 20b. The CLK interruption, P-AIS, and B3 error detectors 19ab, 19ac, 19ad monitor clock pulses contained in output signals which are transmitted from the LTE units 17, 18 over the paths 20a, 20b. When the clock pulses are no longer inputted, the CLK interruption detector 19ab determines that a fault RINDWN has occurred with respect to a path over which the clock pulses are no longer inputted or the the signal transmitted over such path. The CLK interruption detector 19ab generates a path switch alarm PSA with respect to such a path, and sends the path switch alarm PSA to the switch mechanism 19aa. The P-AIS detector 19ac monitors output signals transmitted from the LTE 17, 18 over the paths 20a, 20b. If the P-AIS detector 19ac detects a path alarm indication signal P-AIS that is carried by a transmitted signal in the event of a fault on the higher level side, it generates a path switch alarm PSA with respect to the path over which the path alarm indication signal P-AIS is detected, and sends the generated path switch alarm PSA to the switch mechanism 19aa. As will be described later on in detail witch reference to FIGS. 7 and 8, the B3 error detector 19ad effects a parity check on the output signals transmitted from the LTE units 17, 18 over the paths 20a, 20b, generates a path switch alarm PSA with respect to a path according to the error rate, and sends the path switch alarm PSA to the switch mechanism 19aa.

Unless predetermined settings are not present, the switch mechanism 19aa selects a path other than the path with respect to which a path switch alarm PSA is being generated, and outputs an input signal from the selected path. The settings themselves and operation of the switch mechanism 19aa in the presence of the settings will be described below later on.

Figure 5A:
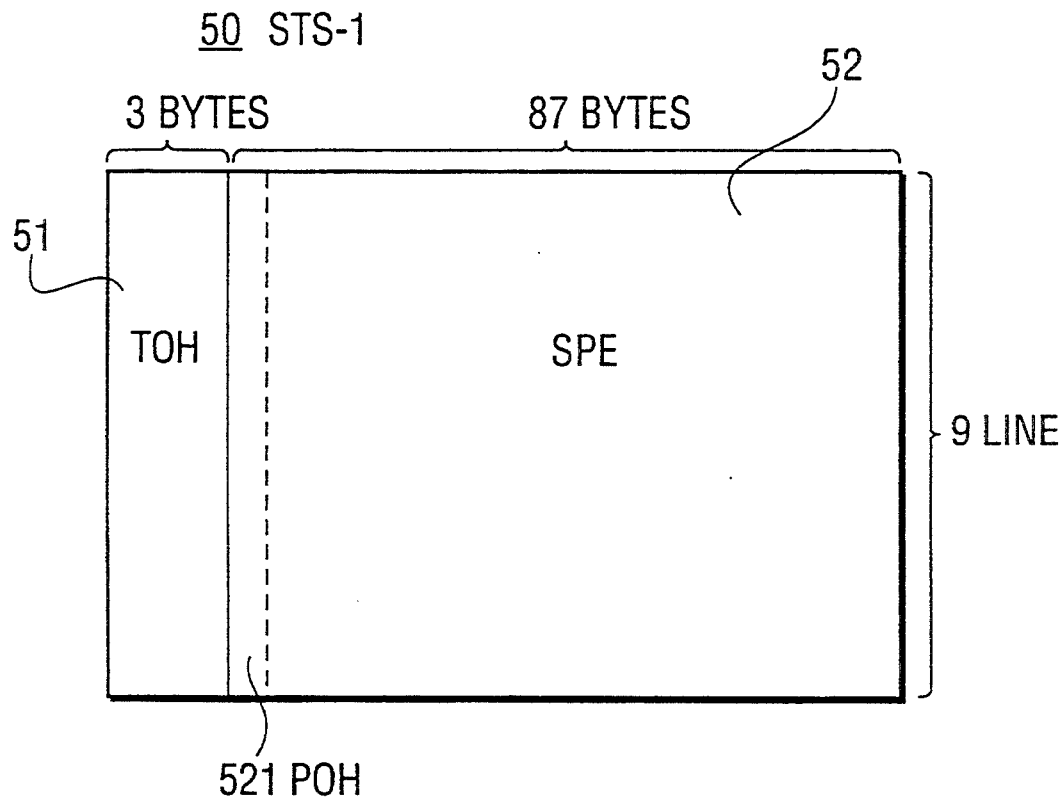
FIG. 5(a) is a diagram of an STS-1 frame of a signal processed in SONET.
Figure 5B:
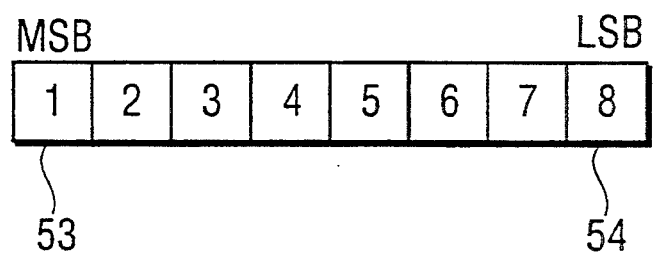
FIG. 5(b) is a diagram of bits of each byte of the STS-1 frame.

FIGS. 5(a) and 5(b) show an STS-1 (Synchronous Transport Signal Level-1) frame of signals handled by the SONET. The STS-1 frame signals are transmitted at a transmission rate of 51.84 Mbit/sec. As shown in FIG. 5(a), an STS-1 frame 50 is composed of 9 rows each having 90 bytes, and hence comprises a total of 810 bytes, The STS-1 frame has a lefthand area composed of 3×9 bytes allocated to a controlling TOH (Transport Overhead) 51 and a righthand area composed of 87×9 bytes allocated to a data SPE (Synchronous Payload Envelope) 52. Thee data SPE 52 includes a single column composed of 9 bytes serving as a path controlling POH (Path Overhead) 521. The path controlling POH 521 can be placed anywhere in the data SPE 52. In the illustrated embodiment, the path controlling POH 521 is located in a leftmost column in the data SPE 52.

FIG. 5(b) shows bits of each byte of the STS-1 frame. For the purpose of identifying the bits, the MSB (Host Significant Bit) 53 of each byte is given an identification number 1, following bits are given successive identification numbers, and the LSB (Least Significant Bit) 54 is given an identification number 8.

The transmission of the STS-1 frame starts from the uppermost lefthand end of the frame as shown in FIG. 5(a), and then goes to the right until the first row is finished. Then, the second, third, rows are successively transmitted, and the transmission ends at the rightmost end of the ninth row. In each byte, the bits are transmitted successively from the MSB 53 toward the LSB 54.

Figure 6:
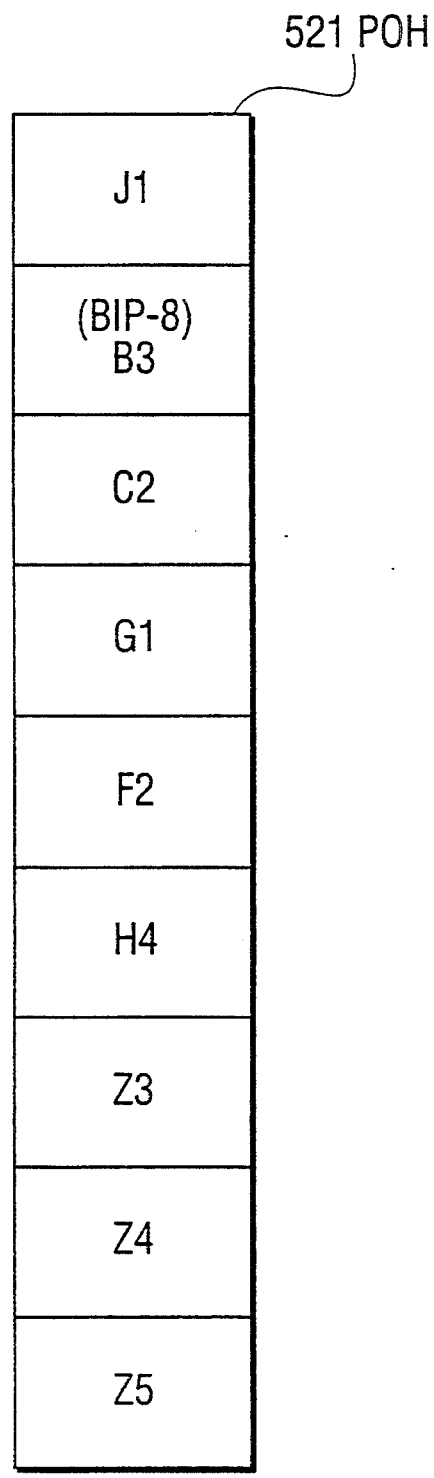
FIG. 6 is a diagram of a line control POH (path overhead)

FIG. 6 shows each byte of the 9-byte path controlling POH 521. The path controlling POH 521 includes a second B3 byte (Bit Interleaved Parity-8) from the upper end, which stores a parity check: result for an STS-1 frame that has been transmitted immediately prior to the present transmission, the parity check result being calculated on the transmitting side before the transmission. The other bytes than the B3 byte will not be described in detail as they have no bearing on the present invention.

Figure 7:
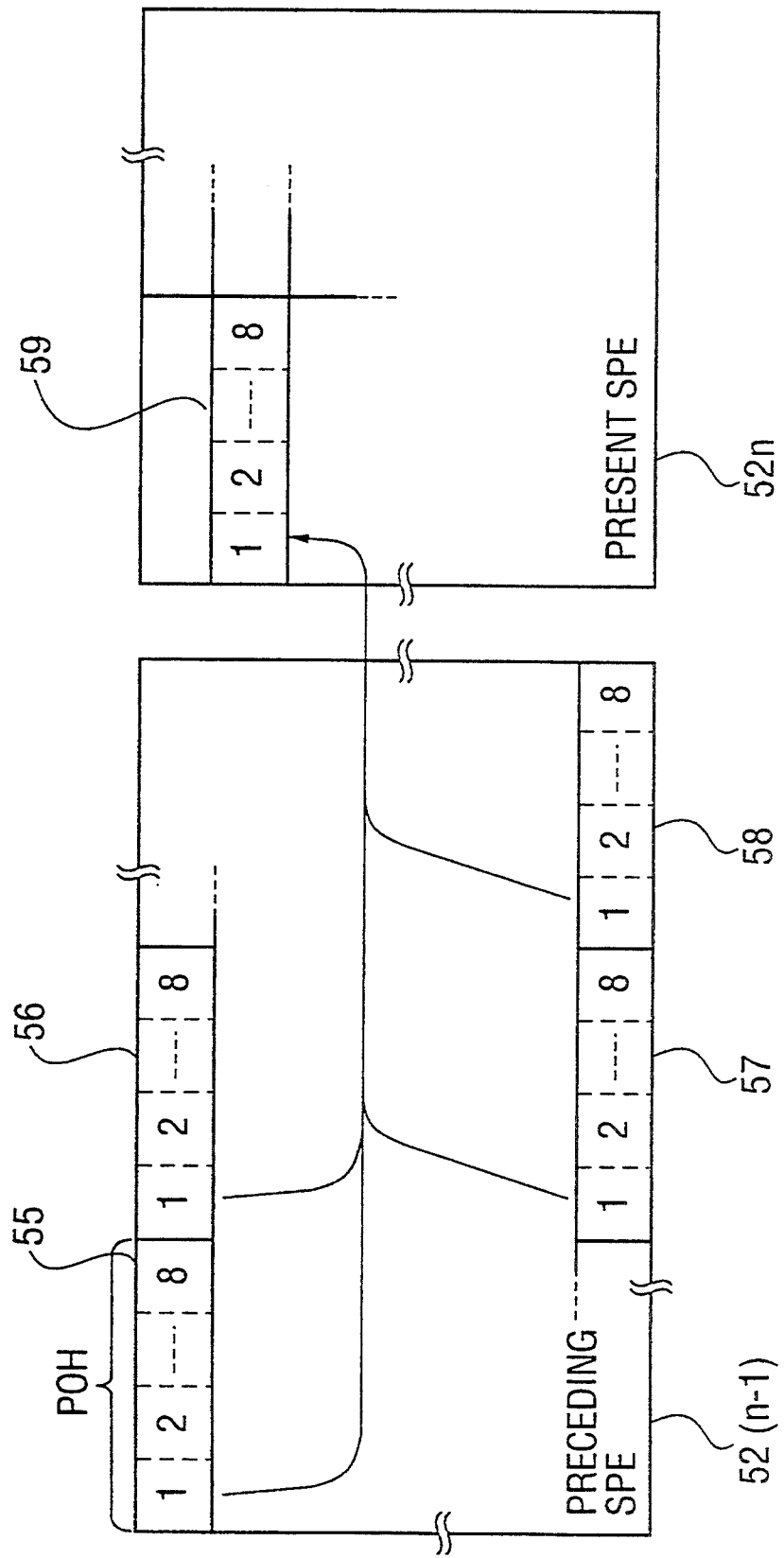
FIG. 7 is a diagram illustrative of the manner in which a parity check result to be stored in a B3 byte is calculated.

FIG. 7 illustrates the manner in which a parity check result to be stored in the B3 byte is calculated, FIG. 7 shows data SPE 52n of an STS-1 frame signal which the transmitting ADM 14 (see FIG, 2) is about to transmit to the receiving ADM 11 at present time, and data SPE 52(n-1) of an STS-1 frame signal which the transmitting ADM 14 has transmitted to the receiving ADM 11 in a preceding cycle. Before transmitting the present SPE 52n, the transmitting ADM 14 effects a parity calculation on all bytes of the preceding SPE 52(n-1), and stores the parity check result in the B3 byte 59 of the path controlling POH of the present SPE 52n. More specifically, the transmitting ADM 14 adds all values stored in the first bits (MSB) of bytes 55, 56, 57, 58 of the preceding SPE 52(n-1), If the sum is an odd number, then the transmitting ADM 14 stores "0" in the first bit of the B3 byte 59 of the path controlling POH of the present SPE 52n. If the sum is an even number, then the transmitting ADM 14 stores "1" in the first bit of the B3 byte 59 of the path controlling POH of the present SPE 52n, Likewise, the transmitting ADM 14 adds all values stored in the second bits (the bits having an identification number 2 in FIG, 5(b)) of the bytes 55, 56, 57, 58 of the preceding SPE 52(n-1), and stores "0" or "1" in the second bit of the B3 byte 59 of the path controlling POH of the present SPE 52n. Similarly, the transmitting ADM 14 adds all values stored in the remaining bits of the bytes of the preceding SPE 52(n-1), and stores "0" or "1" in the corresponding bit of the B3 byte 59 of the path controlling POH of the present SPE 52n, until the parity check results are stored in all the 8 bits of the B3 byte 59 of the path controlling POH of the present SPE 52n.

Figure 8:
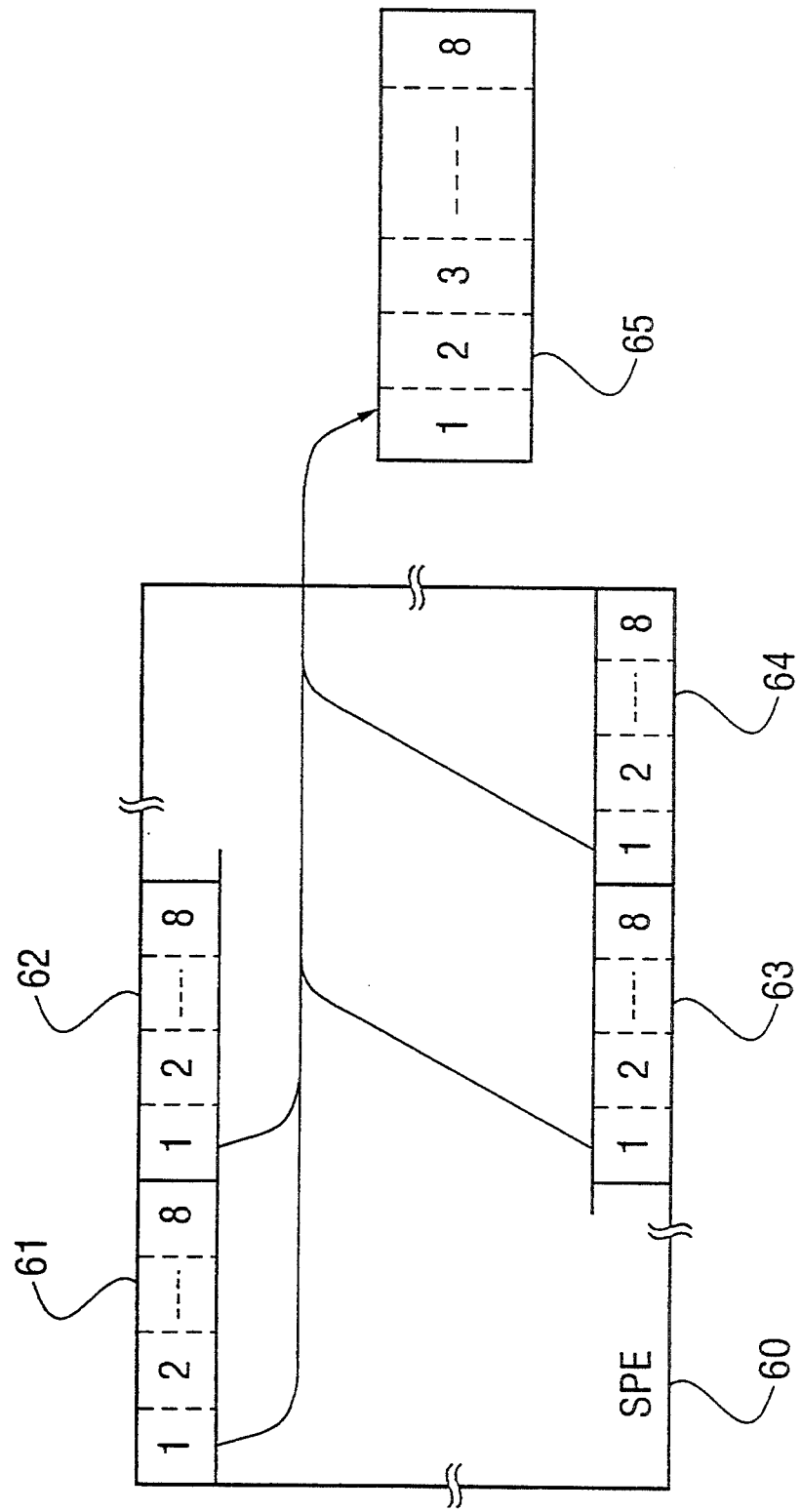
FIG. 8 is a diagram illustrative of a parity check process in a path switch.

The B3 byte thus generated in the transmitting ADM 14 and the data to be transmitted are then transmitted as STS-1 frame signals from the ADM 14 to the path switch over the gate 14a, the transmission line 15c, the ADM the transmission line 15d, the LTE unit 17, and the path 20a, and also over the gate 14b, the transmission line 16b, the ADM 12, the transmission line 16a, the LTE unit 18, and the path 20b. In response to the supplied STS-1 frame signals, the path switch 19a operates as follows:

FIG. 8 shows a parity check process in the path switch 19a (see FIG. 2). In the path switch 19a, the B3 error detector 19ad (see FIG. 4) effects a parity check on the STS-1 frame signals which have been received from the paths 20a,20b. FIG. 8 shows a parity check process for one of the received STS-1 frame signals. The other received STS-1 frame signal is also processed by the same parity check process. In FIG. 8, the B3 error detector 19ad adds all values stored in the first bits (MSB) of all bytes 61, 62, 63, 64 of the data SPE 60 of the received STS-1 frame signal. If the sum is an odd number, then the B3 error detector 19ad stores "0" in the first bit (indicated by 1 in FIG. 8) of a comparison register 65 (not shown in FIG. 4) in the path switch 19a. If the sum is an even number, then the B3 error detector 19ad stores "1" in the first bit of the comparison register 65. Likewise, the B3 error detector 19ad adds all values stored in the second bits of the bytes 61, 62, 63, 64 of the data SPE 60 of the received STS-1 frame signal, and stores "0" "1" in the second bit (indicated by 2 in FIG. 8) of the comparison register 65. Similarly, the B3 error detector 19ad adds all values stored in the remaining bits of the bytes 61, 62, 63, 64 of the data SPE 60 of the received STS-1 frame signal, and stores "0" or "1" in the corresponding bits of the comparison register 65, until the parity check results are stored in all the 8 bits of comparison register 65.

Then, the path switch 19a reads the values stored in the B3 byte of a next STS-1 frame signal that is received over the same path subsequently to the presently received STS-1 frame signal, and compares the read values with the values in the comparison register 65 which stores the result of the parity check of the presently received STS-1 frame signal. In the absence of transmission line faults and noise, the values stored in the comparison register 65 should agree with the values in the B3 byte of the next STS-1 frame signal. In the event of transmission line faults or noise, however, some compared bits disagree with each other depending on the degree of the transmission line faults or noise. The number of pairs of compared bits which disagree with each other is counted as a B3 error count (up to 8). The B3 error count is produced with respect to the two transmission paths.

An error rate is calculated based on the number of accumulated B3 error counts. If the error rate is 0.1% or higher, then it is determined that a "B3 Maj Error" has occurred. If the error rate is lower than 0.1%, then it is determined that a "B3 Min Error" has occurred.

At the same time, the CLK interruption detector 19ab (see FIG. 4) of the path switch 19a monitors the STS-1 frame signals received over the respective two paths for a fault RINDWN, and the P-AIS detector 19ac thereof detects an alarm signal P-AIS. If a fault. RINDWN is produced, or an alarm signal P-AIS is detected, or a B3 Maj Error or a B3 Min Error occurs, then a PSA (Path Switch Alarm) bit stored in a memory (not shown) in the path switch 19a with respect to each of the two paths as indicating a transmission line fault or a signal fault is set to "H" (i.e., a high level of a binary signal).

The switch mechanism 19aa (see FIG. 4) of the path switch 19a operates to send an STS-1 frame signal, which is transmitted over the other path than the path for which the PSA bit is set to "H", to the converter 19d (see FIG. 2). The faults, given below, (B3 Min Error may however include a normal condition) that can be detected from the STS-1 frame signals received over the respective paths are classified in different ranks of lesser importance in the order named. If the PSA bits are set to "H" for both paths, then the switch mechanism 19aa operates to send an STS-1 frame signal received from the path that is subjected to a fault of a lower rank, to the converter 19d.

1. P-AIS or RINDWN;
2. B3 Maj Error and
3. B3 Min Error.

When faults of the same rank are detected from the STS-1 frame signals received over the two paths, the path switch 19a is changed over to the initial path. Such a changeover process is referred to as a revertible process.

Therefore, even in the event of simultaneous detection of faults in the two paths, the path switch 19a can operate properly for the transmission of signals. This function of the path switch 19a is referred to as a first mode function.

The path switch 19a also has a function for locking the changeover operation of the path switch 19a itself. More specifically, the memory of the path switch 19a has an L-IN E/D (Lock-In Enable/Disable) bit. The L-IN E/D bit is set to "H" if the function for Locking the changeover operation of the path switch 19a is to be activated, and to "L" if the function for locking the changeover operation of the path switch 19a is to be inactivated.

The number of times that the path switch 19a has been changed over is counted, The memory of the path switch 19 has a L-IN CNT (Lock-In Control) bit, which is set to "L" before the changeover count reaches a predetermined value, and to "H" after the changeover count reaches the predetermined value.

The path switch 19a monitors the L-IN CNT bit and the L-IN ED bit. When the L-In CNT bit is "H" and the L-IN E/D bit is "H", the switch mechanism 19aa of the path switch 19a is locked against further changeovers. FIG. 9 shows path switch states depending on the L-IN CNT bit and the L-IN ED bit.

Consequently, if faults occur in succession and as a result the path switch 19a is caused to change over frequently, then the path switch 19a is locked against further changeovers, and hence prevented from chattering. This function of the path switch 19a is referred to as a second mode function.

The path switch 19a has another function which allows the path switch 19a to be manually changed over for the confirmation of its operation when no PSA is produced. More specifically, the memory of the path switch 19a has a MANU MODE (Manual Mode) bit, which is set to "H" when the function to manually change over the path switch 19a is to be activated, and to "L" when the function to manually change over the path switch 19a is to be inactivated, The memory of the path switch 19 also has a MAINT MANU (Maintenance) bit for preventing the path switch 19a from being manually changed over in error due to the MANU MODE bit. The MAINT MANU bit is set to "H" when the function to manually change over the path switch 19a is to be inactivated, and to "L" when the function to manually change over the path switch 19a is to be activated.

Therefore, when the MANU MODE bit is "H", the MAINT MANU bit is "L", and the PSA bit is "L", the path switch 19a can be manually changed over. FIG. 10 shows path switch states depending on the MANU MODE bit, the MAINT MANU bit, and the PSA bit. The symbol "*" in FIG. 10 indicates that the path switch 19a operates irrespective of whether the MANU MODE bit, the MAINT MANU bit, and the PSA bit are "H" or "L". The symbol "*" in FIGS. 12 and 15 also indicates that the path switch 19a operates irrespective of the levels of the related bits. The symbol "H" in the column "Path SW" in FIG. 10 shows that the switch mechanism 19aa of the path switch 19a is manually shifted to the WEST path which passes through the LTE unit 17 in FIG. 2. The symbol "L" in the column "Path SW" in FIG. 10 shows that the switch mechanism 19aa of the path switch 19a is manually shifted to the EAST path which passes through the LTE unit 18 in FIG. 2. The symbols "H", "L" in the column "Path SW" in FIGS. 12 and 13 also have the same meaning as above.

The MAINT MANU bit is effective to prevent the path switch 19a from being manually changed over in error, but may not necessarily be included, and hence may be omitted.

Therefore, in the absence of a fault, the switch mechanism 19aa of the path switch 19a may be manually changed over for the confirmation of whether the path switch 19a can be changed over properly. This mode of the path switch 19a is referred to as a third mode function.

When a signal from the transmitting ADM is not transmitted bidirectionally over the ring-shaped transmission lines, but transmitted over a unidirectional path, and thus the receiving ADM is required to receive the signal over the unidirectional path, the path switch 19a is provided with a Tributary East/West function to select and lock a path to which the path switch 19a is to be connected. More specifically, the memory of the path switch 19a has a PROV. (Provisioning) E bit and a PROV. (Provisioning) W bit. If the path to be selected and locked for the connection to the path switch 19a is the EAST path, then the PROV. E bit is set to "H", and the PROV. W bit is set to "L". On the other hand, if the path to be selected and locked for the connection to the path switch 19a is the WEST path, then the PROV. E bit is set to "L", and the PROV. W bit is set to FIG. 11 shows path switch states depending on the PROV. E bit and the PROV. W bit.

Therefore, the path switch 19a is capable of transmitting and receiving an optical signal only over a unidirectional one of the ring-shaped transmission lines. This mode of the path switch 19a is referred to as a fourth mode function.

The path switch 19a is also provided with a function to lock itself to one of the paths for a test irrespective of whether a PSA is produced or not. More specifically, the memory of the path switch 19a has a FORCE MODE (Force Mode) bit, which is set to "H" when the function to forcibly change over the path switch 19a is to be activated, and to "L" when the function to forcibly change over the path switch 19a is to be inactivated. The memory of the path switch 19 also has a MAINT FORCE (Maintenance) bit for preventing the path switch 19a from being forcibly changed over in error due to the FORCE MODE bit. The MAINT FORCE bit is set to "H" when the function to forcibly change over the path switch 19a is to be inactivated, and to "L" when the function to forcibly change over the path switch 19a is to be activated.

Consequently, when the FORCE MODE bit is "H" and the MAINT FORCE bit is "L" the path switch 19a can be forcibly be changed over. FIG. 2 shows path switch states depending on the FORCE MODE bit and the MAINT FORCE bit.

The MAINT FORCE bit is effective to prevent the path switch 19a from being manually changed over in error, but may not necessarily be included, and hence may be omitted.

Therefore, even in the event of a fault, the switch mechanism 19aa of the path switch 19a may be forcibly changed over for a test. This mode of the path switch is referred to as a fifth mode function.

If the receiving ADM 11 is in such a condition that at least two of the above five functions are to be simultaneously performed, then the path switch 19a will be changed over successively for thee fifth mode function, the fourth mode function, the third mode function, the second mode function, and the first mode function in the order named.

FIG. 15 shows path switch states depending on the above order of priority of the five functions. In FIG. 13, the column "MAIT FC" corresponds to the column "MAINT FORCE" IN FIG. 12, the column "FC MODE" to the column "FORCE MODE" in FIG. 12, the column "PROV (E)" to the column "PROV.E" in FIG. 11, and the column "PROV (W)" to the column "PROV.W" in FIG. 11. The column "P-SW DEF" in FIG. 13 is "H" if the initial setting of the the path switch 19a is WEST, and "L" if the initial setting of the path switch 19a is EAST. In the column "OPERATION", the "AUTO" setting indicates normal operation of the switch mechanism 19aa irrespective of the five functions, the "L-IN" setting indicates operation of the switch mechanism 19aa according to "H" or "L" in the column "P-SW DEF", the "MANU" setting indicates operation of the switch mechanism 19aa according to "H" or "L" in the column "Path SW", the "PROV" setting indicates operation of the switch mechanism 19aa according to "H" or "L" in the columns "PROV (E)" and "PROV (W)", and the "FORCE" setting indicates operation of the switch mechanism 19aa according to "H" or "L" in the column "Path SW".

Figure 14:
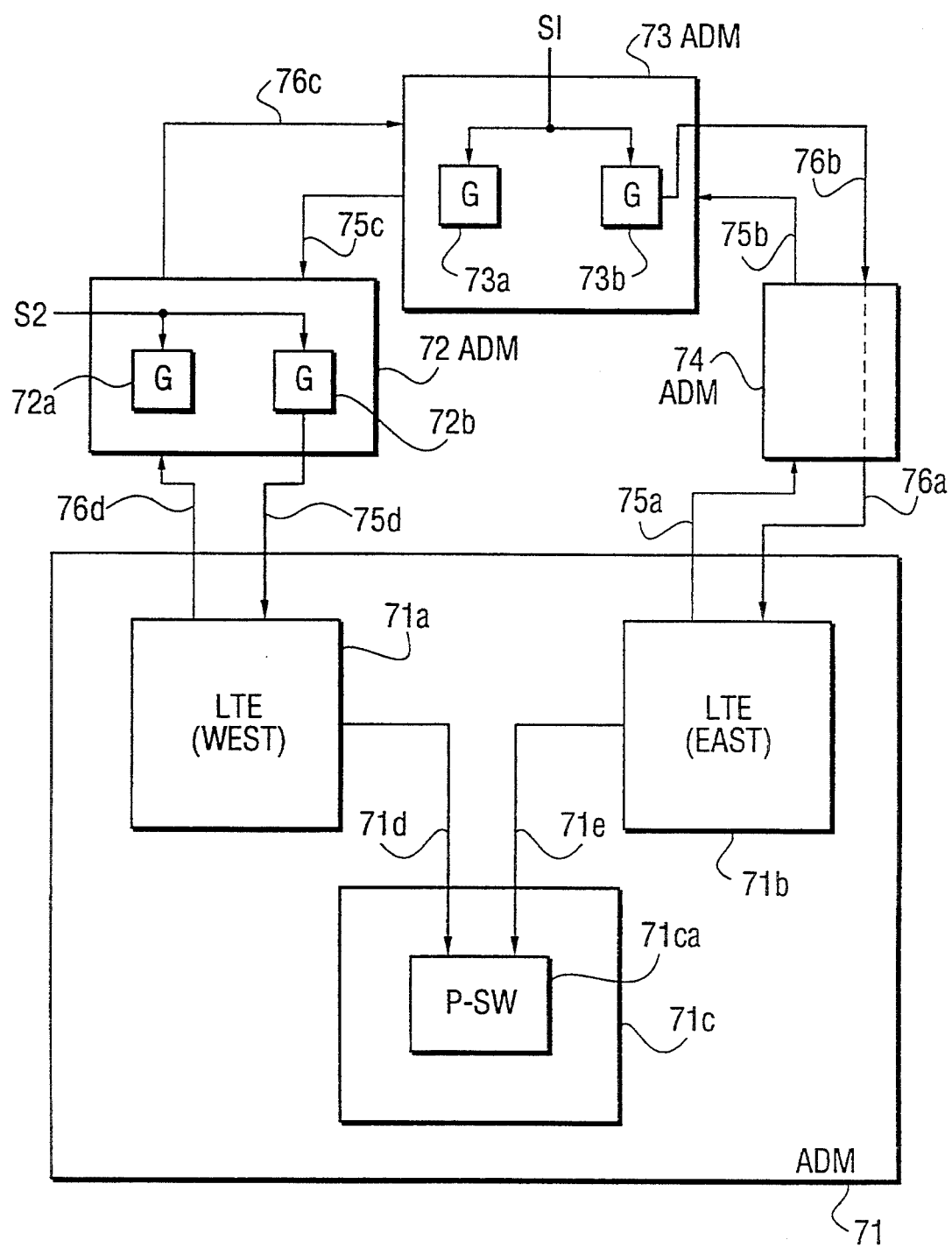
FIG. 14 is a block diagram of another system of optical transmission lines and optical transmission devices connected thereto in a linear mode.

FIG. 14 shows in block form another system of optical transmission lines and optical transmission devices connected thereto in a linear mode.

As shown in FIG. 14, the system comprises FLM 150/600 ADMs 71, 72, 75, 74 according to the SONET. The ADMs 71, 72, 75, 74 are connected by reciprocatory optical transmission lines 75a–75d, 76a–76d, Since the ADMs 71, 72, 73, 74 are of an identical internal structure and identical to the ADM 11 shown in FIG, 2, the internal structure of the ADMs 71, 72, 73, 74 will not be described below, and is shown only schematically. The ADM 71 is shown as having WEST LTE 71a, EAST LTE 71b, and PTE unit 71c including a path switch 71ca. The ADM 72 is shown as having gates 72a, 72b, and the ADM 73 is shown as having gates 73a, 73b.

In the linear mode shown in FIG. 14, the ADMs 73, 72 serve as transmitting ADMs, and the ADM 71 as a receiving ADM. In the transmitting ADM 73, only the gate 73b is opened to transmit a signal S1 to the AMH 74. Since the transmitted signal S1 is not destined to the ADM 74, the ADM 74 passes the signal S1 to the LTE 71b of the next ADM 71. The LTE unit 71b sends the transmitted signal S1 over a path 71e to the path switch 71ca. In the transmitting ADM 72, only the gate 72b is opened to transmit a signal S2 to LTE unit 71a of the ADM 71. The LTE unit 71a sends the transmitted signal S2 over a path 71d to the path switch 71ca.

Based on an un-eq (Un-Equipment) code contained in the transmitted signals S1, S2, the path switch 71ca connects the path from which no un-eq code is detected to a lower-level receiver, and transfers the transmitted signal S1 or S2 to the lower-level receiver. The un-eq code is a code that is indicated by the state in which all bits of a C2 byte (see FIG. 6) of the POH of the STS-1 frame are "0". On normal transmitted signals, not all the 8 bits of the C2 byte of the POH of the STS-1 frame are "0". When no signal is transmitted, the condition is equivalent to the reception by the receiving ADM of a signal whose all bits of the C2 byte are "0". Therefore, when an un-eq code is received, no signal reaches the path which is receiving the un-eq code.

When the path switch 71ca is not receiving an un-eq code from both paths (i.e., C2@0, or when it is receiving transmitted signals S1, S2 from both paths), the path switch 71ca maintains its connection that has been established thus far. When the path switch 71ca is receiving an un-eq code from both paths (i.e., C2=0, or when it is not receiving transmitted signals S1, S2 from both paths), the path switch 71ca operates in the revertible process to switch to the initial path.

The path switch 71ca is provided with a Tributary East/West function to select and lock a path to which the path switch 19a is to be connected. More specifically, the memory of the path switch 71ca has a PROV. (Provisioning) (E) bit and a PROV, (Provisioning) (W) bit. If the path to be selected and locked for the connection to the path switch 71ca is the EAST path, then the PROV (E) bit is set to "H" and the PROV, (W) bit is set to "L", On the other hand, if the path to be selected and Locked for the connection to the path switch 71ca is the WEST path, then the PROV, (E) bit is set to "L", and the PROV, (W) bit is set to "H". Therefore, the path switch 71ca can be locked to a connection for the ADM 71 to receive an optical signal only from the optical transmission line 76a or 75d. When the Tributary East/West function is activated, the path switch 71ca is actuated with priority irrespective of whether an un-eq code is detected or not.

As with the first embodiment described above, the path switch 71ca monitors optical signals from both paths for a fault RINDWN, and in the event of a fault RINDWN, the path switch 71ca is changed over in the same manner as when an un-eq code is detected.

FIG. 15 shows the manner in which a path switch operates in the linear mode with respect to the above functions. In FIG. 15, "Path E" in the columns "RINDWN" and "C2 BYTE" indicates the path 71e in FIG. 14, and "Path W" indicates the path 71d in FIG. 14, "NO ALM" indicates the occurrence of no fault RINDWN. "ALM" indicates the occurrence of a fault RINDWN, The column "SELECTED PATH" shows paths to which the path switch 71ca is connected. Particularly, "EAST PATH (Rev)" in the column "SELECTED PATH" indicates that the path switch 71ca is changed over to the initial path (i,e,, the EAST path in this embodiment) in the revertible process.

The Tributary East/West function allows the ADM operating in the linear mode to transmit and receive optical signals using only a unidirectional one of the optical transmission lines.

As described above, based on the state of a signal supplied to the path switch, either one of a plurality of PSAs indicative of various signal faults is generated, and the path switch is actuated according to the generated PSA to output one of output signals from the two LTE units to the lower-level receiver. Consequently, the operation of the path switch can be controlled properly depending on the state of the received signal.

The first control mode operating during the A/B ring mode can actuate the path switch properly even if signals containing faults are simultaneously applied to the path switch over the two paths.

The second control mode operating during the A/B ring mode prevents the path switch from changing over frequency and hence from chattering even if signals supplied to the path switch contain successive faults.

The third control mode operating during the A/B ring mode is capable of easily confirming whether the path switch is changed over normally.

The fourth control mode operating during the A/B ring mode allows the ADM to transmit and receive optical signals using only a unidirectional one of the optical transmission lines.

The fifth control mode operating during the A/B ring mode is effective to forcibly change over the path switch for a test.

When optical signals are to be received using only a unidirectional one of the optical transmission lines in the linear mode, the Tributary East/West function of the path switch is activated. Therefore, optical signals can be received using only a unidirectional one of the optical transmission lines in the linear mode.

The foregoing is considered as illustrative only of the principles of the present invention. Further, since numerous modifications and changes will readily occur to those skilled in the art, it is not desired to limit the invention to the exact construction and applications shown and described, and accordingly, all suitable modifications and equivalents may be resorted to, falling within the scope of the invention in the appended claims and their equivalents.

What is claimed is:

1. A method of changing over a path switch in an optical transmission device having a first line terminal equipment unit and a second line terminal equipment unit for receiving optical signals transmitted bidirectionally over optical transmission lines, the path switch being connected to respective paths to said first line terminal equipment unit and said second line terminal equipment unit, and selectively outputting respective output signals from said first line terminal equipment unit and said second line terminal equipment unit to a lower-level receiver, said method comprising the steps of:

receiving the optical signals, transmitted bidirectionally over the optical transmission lines, by said first line terminal equipment unit and said second line terminal equipment unit;

generating by said first line terminal equipment unit and said second line terminal equipment unit the respective output signals responsive to the optical signals;

monitoring, with said path switch, the output signals transmitted by said first line terminal equipment unit and said second line terminal equipment unit to said path switch over the respective paths;

generating one of a plurality of path switch alarms indicative of respective faults of the output signals, based on states of the output signals applied to said path switch; and actuating said path switch depending on the generated path switch alarm to output a selected one of the respective output signals from said first line terminal equipment unit and said second line terminal equipment unit to said lower-level receiver.

2. A method of changing over a path switch in an optical transmission device having two line terminal equipment units for receiving optical signals transmitted bidirectionally over optical transmission lines, and the path switch being connected to respective paths to the line terminal equipment units, for selectively outputting respective output signals from the line terminal equipment units to a lower-level receiver, said method comprising the steps of:

monitoring, with said path switch, the respective output signals transmitted by said two line terminal equipment units to said path switch over the respective paths;

generating one of a plurality of path switch alarms indicative of respective faults of the output signals, based on states of the respective output signals applied to said path switch; and actuating said path switch depending on the generated path switch alarm to output a selected one of the respective output signals from said two line terminal equipment units to said lower-level receiver;

transmitting SONET signals from said optical transmission lines arranged in a ring shape to said two line terminal equipment units in an A/B ring mode;

classifying said path switch alarms in different ranks depending on the degree of signal faults indicated thereby;

generating path switch alarms based on the states of two of the respective output signals that are supplied simultaneously to said path switch over said paths; and connecting the path transmitting the signal with respect to which a path switch alarm in a lower rank is generated, to said lower-level receiver with said path switch.

3. A method of changing over a path switch in an optical transmission device having two line terminal equipment units for receiving optical signals transmitted bidirectionally over optical transmission lines, and the path switch being connected to respective paths to the line terminal equipment units, for selectively outputting respective output signals from the line terminal equipment units to a lower-level receiver, said method comprising the steps of:

monitoring, with said path switch, the respective output signals transmitted by said two line terminal equipment units to said path switch over the respective paths;

generating one of a plurality of path switch alarms indicative of respective faults of the respective output signals, based on states of the respective output signals applied to said path switch; and actuating said path switch depending on the generated path switch alarm to output a selected one of the respective output signals from said two line terminal equipment units to said lower-level receiver;

transmitting SONET signals from said optical transmission lines arranged in a ring shape to said two line terminal equipment units in an A/B ring mode;

counting the number of times which said path switch is changed over from the connection between one of said paths and said lower-level receiver to the connection between the other of said paths and said lower-level receiver to the connection between the other of said paths and said lower-level receiver, and vice versa; and locking said path switch against further change-overs when the counted number of times reaches a predetermined value.

4. A method of changing over a path switch in an optical transmission device having two line terminal equipment units for receiving optical signals transmitted bidirectionally over optical transmission lines, and the path switch being connected to respective paths to the line terminal equipment units, for selectively outputting respective output signals from the line terminal equipment units to a lower-level receiver, said method comprising the steps of:

monitoring with said path switch, the respective output signals transmitted by said two line terminal equipment units to said path switch over the respective paths;

generating one of a plurality of path switch alarms indicative of respective faults of the respective output signals, based on states of the respective output signals applied to said path switch; and actuating said path switch depending on the generated path switch alarm to output a selected one of the respective output signals from said two line terminal equipment units to said lower-level receiver;

transmitting SONET signals from said optical transmission lines arranged in a ring shape to said two line terminal equipment units in an A/B ring mode;

providing said path switch with a manual changeover function to manually change over from the connection between one of said paths and said lower-level receiver to the connection between the other of said paths and said lower-level receiver, and vice versa; and activating said manual changeover function only when said path switch alarms are not produced.

5. A method of changing over a path switch in an optical transmission device having two line terminal equipment units receiving optical signals transmitted bidirectional by over optical transmission lines, and the path switch being connected to respective paths to the line terminal equipment units, for selectively outputting respective output signals from the line terminal equipment units to a lower-level receiver, said method comprising the steps of:

monitoring, with said path switch, the respective output signals transmitted by said two line terminal equipment units to said path switch over the respective paths;

generating one of a plurality of path switch alarms indicative of respective faults of the respective output signals, based on states of the respective output signals applied to said path switch; and actuating said path switch depending on the generated path switch alarm to output a selected one of the respective output signals from said two line terminal equipment units to said lower-level receiver;

transmitting SONET signals from said optical transmission lines arranged in a ring shape to said two line terminal equipment units in an A/B ring mode;

providing said path switch with a tributary path function to select and lock the connection between one of said paths and said lower-level receiver or the connection between the other of said paths and said lower-level receiver; and activating said tributary path function when said optical transmission device is required to receive an optical signal from a unidirectional one of said optical transmission lines.

6. A method of changing over a path switch in an optical transmission device having two line terminal equipment units for receiving optical signals transmitted bidirectionally over optical transmission lines, and the path switch being connected to respective paths to the line terminal equipment units, for selectively outputting respective output signals from the line terminal equipment units to a lower-level receiver, said method comprising the steps of:

monitoring, with said path switch, the respective output signals transmitted by said two line terminal equipment units to said path switch over the respective paths;

generating one of a plurality of path switch alarms indicative of respective faults of the respective output signals, based on states of the respective output signals applied to said path switch; and actuating said path switch depending on the generated path switch alarm to output a selected one of the respective output signals from said two line terminal equipment units to said lower-level receiver;

transmitting SONET signals from said optical transmission lines arranged in a ring shape to said two line terminal equipment units in an A/B ring mode;

providing said path switch with a forcible changeover function to forcibly change over from the connection between one of said paths and said lower-level receiver to the connection between the other of said paths and said lower-level receiver, and vice versa; and forcibly changing over said path switch irrespective of whether path switch alarms are generated when said forcible changeover function is activated.

7. A method of changing over a path switch in an optical transmission device having two line terminal equipment units for receiving optical signals transmitted bidirectionally over optical transmission lines, and the path switch being connected to respective paths to the line terminal equipment units, for selectively outputting respective output signals from the line terminal equipment units toga lower-level receiver, said method comprising the steps of:

monitoring with said path switch, the respective output signals transmitted from said two line terminal equipment units to said path switch over the respective paths;

generating one of a plurality of path switch alarms indicative of respective faults of the respective output signals, based on states of the respective output signals applied to said path switch; and actuating said path switch depending on the generated path switch alarm to output a selected one of the respective output signals from said two line terminal equipment units to said lower-level receiver;

transmitting SONET signals from said optical transmission lines to said two line terminal equipment units in a linear mode;

providing said path switch with a tributary path function to select and lock the connection between one of said paths and said lower-level receiver or the connection between the other of said paths and said lower-level receiver; and activating said tributary path function when said optical transmission device is required to receive an optical signal from a unidirectional one of said optical transmission lines.

8. A method according to claim 7, further including the steps of:

monitoring clock pulses contained in the respective output signals transmitted from said two line terminal equipment units to said path switch over the respective paths; and when no clock pulses are supplied from one of said line terminal equipment units while said tributary path function is inactivated, actuating said path switch to output the other of the respective output signals generated by the other line terminal equipment unit to said lower-level receiver.

9. A method of changing over a path switch in an optical transmission device for transmitting and receiving SONET signals in an A/B ring mode, said optical transmission device having two line terminal equipment for receiving optical signals transmitted bidirectionally over ring-shaped optical transmission lines, and the path switch being connected to respective paths to the line terminal equipment, said optical transmission device being operable to generate one of a plurality of path switch alarms indicative of respective faults of the signals, based on the states of the signals transmitted from said line terminal equipment over said respective paths to said path switch, and to actuate said path switch to connect the path other than the path transmitting a signal with respect to which a path switch alarm is generated, to a lower-level receiver, said method comprising the steps of:

providing a first mode for classifying said path switch alarms in different ranks depending on the degree of signal faults indicated thereby, generating path switch alarms based on the states of two signals that are supplied simultaneously to said path switch over said paths, and connecting the path transmitting the signal with respect to which a path switch alarm in a lower rank is generated, to said lower-level receiver with said path switch;

providing a second mode for counting the number of times which said path switch is changed over from the connection between one of said paths and said lower-level receiver to the connection between the other of said paths and said lower-level receiver, and vice versa, and locking said path switch against further changeovers when the counted number of times reaches a predetermined value;

providing a third mode for providing said path switch with a manual changeover function to manually change over from the connection between:one of said paths and said lower-level receiver to the connection between the other of said paths and said lower-level receiver, and vice versa, and activating said manual changeover function only when said path switch alarms are not produced;

providing a fourth mode for providing said path switch with a tributary path function to select and lock the connection between one of said paths and said lower-level receiver or the connection between the other of said paths and said lower-level receiver, and activating said tributary path function when said optical transmission device is required to receive an optical signal from a unidirectional one of said optical transmission lines;

providing a fifth mode for providing said path switch with a forcible changeover function to forcibly change over from the connection between one of said paths and said lower-level receiver to the connection between the other of said paths and said lower-level receiver, and vice versa, and forcibly changing over said path switch irrespective of whether path switch alarms are generated when said forcible changeover function is activated; and controlling said path switch to operate successively in said fifth mode, said fourth mode, said third mode, said second mode, and said first mode in the order named when at least two of said first, second, third, fourth, and fifth modes are to be simultaneously performed.

10. A method of changing over a path switch in an optical transmission device having two line terminal equipment units for receiving optical signals transmitted bidirectionally over optical transmission lines, and the path switch being connected to respective paths to the line terminal equipment units, for selectively outputting respective output signals from the line terminal equipment units to a lower-level receiver, said method comprising the steps of:

monitoring, with said path switch, the respective output signals transmitted by said two line terminal equipment units to said path switch over the respective paths;

generating one of a plurality of path switch alarms indicative of respective faults of the output signals, based on states of the respective output signals applied to said path switch; and actuating said path switch depending on the generated path switch alarm to output a selected one of the respective output signals from said two line terminal equipment units to said lower-level receiver;

transmitting the optical signals from said optical transmission lines arranged in a ring shape to said two line terminal equipment units;

classifying said path switch alarms in different ranks depending on a kind of signal faults indicated thereby;

generating path switch alarms based on the states of two of the respective output signals that are supplied simultaneously to said path switch over said paths; and connecting the path transmitting the signal with respect to which a path switch alarm in a lower rank is generated, to said lower-level receiver with said path switch.

11. A method of changing over a path switch in an optical transmission device having two line terminal equipment units for receiving optical signals transmitted bidirectionally over optical transmission lines, and the path switch being connected to respective paths to the line terminal equipment units, for selectively outputting respective output signals from the line terminal equipment units toga lower-level receiver, said method comprising the steps of:

monitoring, with said path switch, the respective output signals transmitted by said two line terminal equipment units to said path switch over the respective paths;

generating one of a plurality of path switch alarms indicative of respective faults of the respective output signals, based on states of the respective output signals applied to said path switch; and actuating said path switch depending on the generated path switch alarm to output a selected one of the respective output signals from said two line terminal equipment units to said lower-level receiver;

transmitting the optical signals from said optical transmission lines arranged in a ring shape to said two line terminal equipment units;

counting the number of times which said path switch is changed over from the connection between one of said paths and said lower-level receiver to the connection between the other of said paths and said lower-level receiver to the connection between the other of said paths and said lower-level receiver, and vice versa; and locking said path switch against further change-overs when the counted number of times reaches a predetermined value.

12. A method of changing over a path switch in an optical transmission device having two line terminal equipment units for receiving optical signals transmitted bidirectionally over optical transmission lines, and the path switch being connected to respective paths to the line terminal equipment units, for selectively outputting respective output signals from the line terminal equipment units to a lower-level receiver, said method comprising the steps of:

monitoring, with said path switch, the respective output signals transmitted by said two line terminal equipment units to said path switch over the respective paths;

generating one of a plurality of path switch alarms indicative of respective faults of the respective output signals, based on states of the respective output signals applied to said path switch; and actuating said path switch depending on the generated path switch alarm to output a selected one of the respective output signals from said two line terminal equipment units to said lower-level receiver;

transmitting the optical signals from said optical transmission lines arranged in a ring shape to said two line terminal equipment units;

providing said path switch with a manual changeover function to manually change over from the connection between one of said paths and said lower-level receiver to the connection between the other of said paths and said lower-level receiver, and vice versa; and activating said manual changeover function only when said path switch alarms are not produced.

13. A method of changing over a path switch in an optical transmission device having two line terminal equipment units for receiving optical signals transmitted bidirectionally over optical transmission lines, and the path switch being connected to respective paths to the line terminal equipment units, for selectively outputting respective output signals from the line terminal equipment units to a lower-level receiver, said method comprising the steps of:

monitoring, with said path switch, the respective output signals transmitted by said two line terminal equipment units to said path switch over the respective paths;

generating one of a plurality of path switch alarms indicative of respective faults of the respective output signals, based on states of the respective output signals applied to said path switch; and actuating said path switch depending on the generated path switch alarm to output a selected one of the respective output signals from said two line terminal equipment units to said lower-level receiver;

transmitting the optical signals from said optical transmission lines arranged in a ring shape to said two line terminal equipment units;

providing said path switch with a tributary path function to select and lock the connection between one of said paths and said lower-level receiver or the connection between the other of said paths and said lower-level receiver; and activating said tributary path function when said optical transmission device is required to receive an optical signal from a unidirectional one of said optical transmission lines.

14. A method of changing over a path switch in an optical transmission device having two line terminal equipment units for receiving optical signals transmitted bidirectionally over optical transmission lines, and the path switch being connected to respective paths to the line terminal equipment units, for selectively outputting respective output signals from the line terminal equipment units to a lower-level receiver, said method comprising the steps of:

monitoring, with said path switch, the respective output signals transmitted by said two line terminal equipment units to said path switch over the respective paths;

generating one of a plurality of path switch alarms indicative of respective faults of the respective output signals, based on states of the respective output signals applied to said path switch; and actuating said path switch depending on the generated path switch alarm to output a selected one of the respective output signals from said two line terminal equipment units to said lower-level receiver;

transmitting the optical signals from said optical transmission lines arranged in a ring shape to said two line terminal equipment units;

providing said path switch with a forcible changeover function to forcibly change over from the connection between one of said paths and said lower-level receiver to the connection between the other of said paths and said lower-level receiver, and vice versa; and forcibly changing over said path switch irrespective of whether path switch alarms are generated when said forcible changeover function is activated.

15. A method of changing over a path switch in an optical transmission device having two line terminal equipment units for receiving optical signals transmitted bidirectionally over optical transmission lines, and the path switch being connected to respective paths to the line terminal equipment units, for selectively outputting respective output signals from the line terminal equipment units to a lower-level receiver, said method comprising the steps of:

monitoring, with said path switch, the respective output signals transmitted from said two line terminal equipment units to said path switch over the respective paths;

generating one of a plurality of path switch alarms indicative of respective faults of the respective output signals, based on states of the respective output signals applied to said path switch; and actuating said path switch depending on the generated path switch alarm to output a selected one of the respective output signals from said two line terminal equipment units to said lower-level receiver;

transmitting the optical signals from said optical transmission lines to said two line terminal equipment units in a linear mode;

providing said path switch with a tributary path function to select and lock the connection between one of said paths and said lower-level receiver or the connection between the other of said paths and said lower-level receiver; and activating said tributary path function when said optical transmission device is required to receive an optical signal from a unidirectional one of said optical transmission lines.

16. A method according to claim 15, further including the steps of:

monitoring clock pulses contained in the respective output signals transmitted from said two line terminal equipment units to said path switch over the respective paths; and when no clock pulses are supplied from one of said line terminal equipment units while said tributary path function is inactivated, actuating said path switch to output the other of the respective output signals generated by the other line terminal equipment unit to said lower-level receiver.

* * * * *

UNITED STATES PATENT AND TRADEMARK OFFICE
CERTIFICATE OF CORRECTION

PATENT NO. : 5,446,725

DATED : August 29, 1995

INVENTOR(S) : Junichi ISHIWATARI

It is certified that error appears in the above-indentified patent and that said Letters Patent is hereby corrected as shown below:

```
Col. 1,   line 30, after "SONET" insert --,--;
          line 57, after "supplied" insert --,--.
Col. 5,   line 49, change "unit" to --units--;
          line 50, change "unit" to --units--.
Col. 7,   line 35, change "Thee" to --The--;
          line 42, change "Host" to --Most--;
          line 57, delete ":".
Col. 8,   line 32, after "switch" insert --19a--;
          line 33, after "ADM" insert --13--.
Col. 10,  line 42, change "15" to --13--.
Col. 11,  line 38, change "Fig 2" to --FIG. 12--;
          line 47, after "switch" insert --19a--;
          line 56, change "FIG. 15" to --FIG. 13--
Col. 12,  line 15, change "75" to --73--;
```

UNITED STATES PATENT AND TRADEMARK OFFICE
CERTIFICATE OF CORRECTION

PATENT NO. : 5,446,725
DATED : August 29, 1995
INVENTOR(S) : Junichi ISHIWATARI

It is certified that error appears in the above-indentified patent and that said Letters Patent is hereby corrected as shown below:

Col. 12, line 16, change "75" to --73--.

line 29, change "AMH" to --ADM--;

line 30, change "to" to --for--.

Col. 13, line 1, change "," to --.--.

Col. 16, line 11, after "units" insert --for--;

line 12, change "bidirectional" to

--bidirectionally--, and delete "by".

Signed and Sealed this

Ninth Day of January, 1996

Attest:

BRUCE LEHMAN

Attesting Officer      Commissioner of Patents and Trademarks